G. MARANVILLE.
CAR-BRAKE.
No. 175,867.　　　　　　　　Patented April 11, 1876.
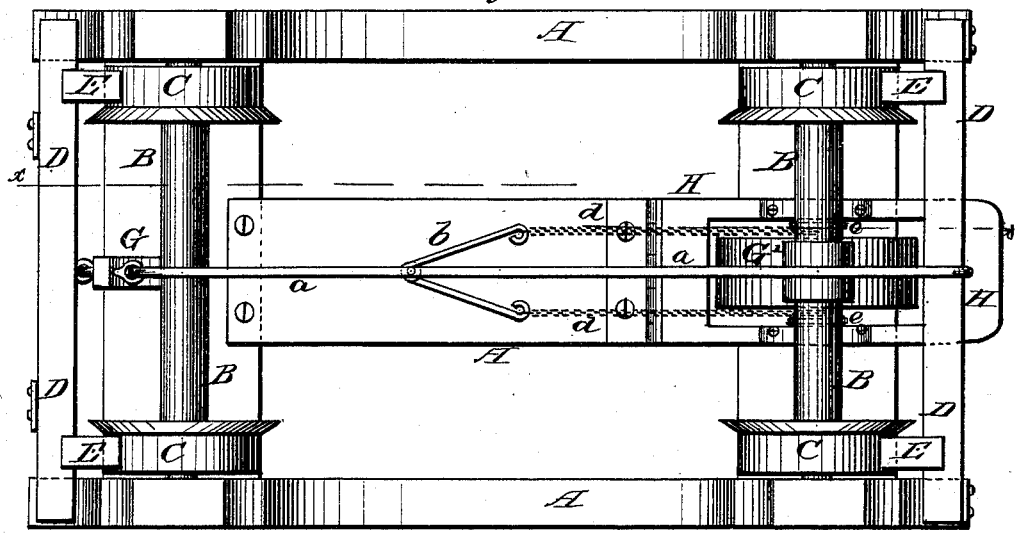
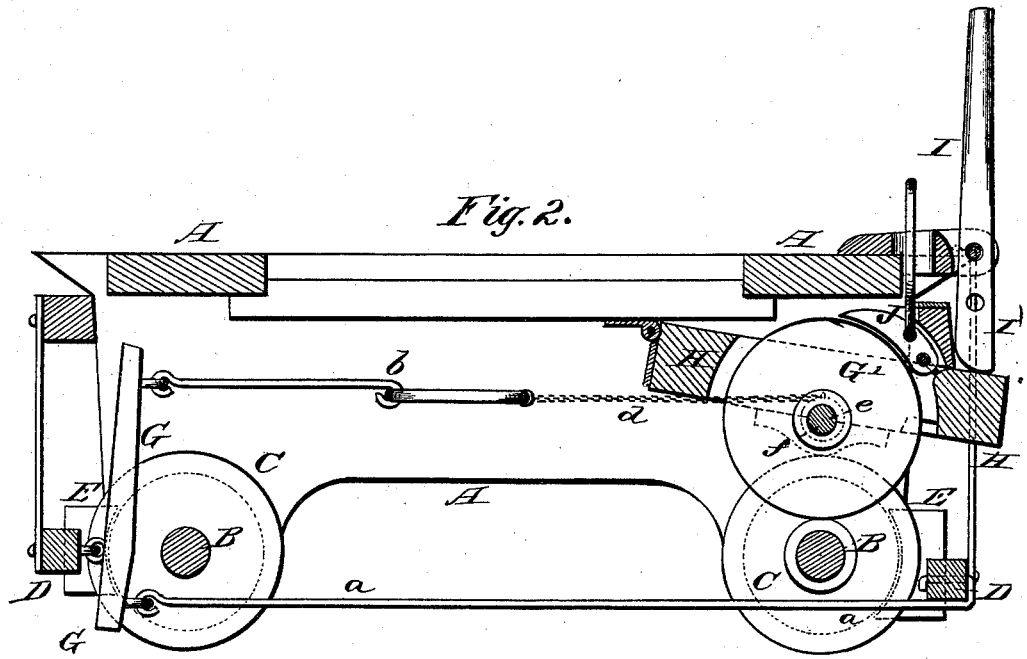

UNITED STATES PATENT OFFICE.

GALUSHA MARANVILLE, OF RUTLAND, VERMONT.

IMPROVEMENT IN CAR-BRAKES.

Specification forming part of Letters Patent No. 175,867, dated April 11, 1876; application filed March 8, 1876.

*To all whom it may concern:*

Be it known that I, GALUSHA MARANVILLE, of Rutland, in the county of Rutland and State of Vermont, have invented certain new and useful Improvements in Car-Brakes; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to car-brakes; and it consists in the construction and arrangement of devices for applying the brakes by the motion of the car, as will be hereinafter more fully set forth.

In the annexed drawing, Figure 1 is a bottom view and Fig. 2 is a central vertical section on line $x\ x$, Fig. 1.

A represents the truck or frame of a railroad-car, with axles B B and wheels C C. At each end of the frame A is suspended the brake-bar D, with shoes E E, and one of these brake-bars is, by a rod, $a$, connected with one end of a lever, G, pivoted on the other brake-bar. The other end of this lever is, by a rod, $b$, connected with two chains, $d\ d$, which are attached to two pulleys, $e\ e$, secured upon a shaft, $f$, one on each side of a wheel, $G'$, also secured to said shaft. This shaft $f$ with its wheel and pulleys is mounted in a frame, H, which is hinged under the main frame A. At the end of said main frame is pivoted a lever, I, the lower end of which is to bear on the outer end of the frame H in such a manner that the wheel $G'$ may be thrown in contact with the axle B, or with a collar or pulley thereon, thereby winding up the chains $d$ and applying the brakes. Directly upon the wheel $G'$ acts a brake, J, to regulate the pressure of the car-brakes. If, for instance, it is not desired to stop the car, but simply to slacken the speed, the lever I is put in use, as above described, until the proper rate of speed is attained; then the brake J is applied to the wheel $G'$, and the lever I released, when the brakes are held and prevented from moving away from the car-wheels.

Having thus fully described my invention, what I claim as new, and desire to secure by Letters Patent, is—

The brake J, in combination with the wheel $G'$, pulleys $e$, chains $d$, and the brake mechanism connected therewith, substantially as and for the purposes herein set forth.

In testimony that I claim the foregoing as my own I affix my signature in presence of two witnesses.

GALUSHA MARANVILLE.

Witnesses:
    H. W. PORTER,
    GEO. H. CHENEY.